US006798084B1

(12) United States Patent
Gobel et al.

(10) Patent No.: US 6,798,084 B1
(45) Date of Patent: Sep. 28, 2004

(54) NETWORKED VEHICLE COMMUNICATIONS SYSTEM WITH FRONT END UNIT A TERMINAL WHICH CAN BE OPERATED BY A USER AND A CORRESPONDING APPLICATION

(75) Inventors: Fridjof Gobel, Besigheim (DE); Ralf Hahn, Main-Kastel (DE); Peter Hudel, Friedberg (DE); Cornelius Koburg, Pfungstadt (DE); Peter Lutz, Glashutten (DE); Jutta Schneider, Tubingen (DE)

(73) Assignee: DaimlerChrysler AG, Stuttgart (DE)

( * ) Notice: Subject to any disclaimer, the term of this patent is extended or adjusted under 35 U.S.C. 154(b) by 0 days.

(21) Appl. No.: 10/018,893

(22) PCT Filed: May 13, 2000

(86) PCT No.: PCT/EP00/04336

§ 371 (c)(1),
(2), (4) Date: May 6, 2002

(87) PCT Pub. No.: WO01/01261

PCT Pub. Date: Jan. 4, 2000

(30) Foreign Application Priority Data

Jun. 26, 1999 (DE) .......................................... 199 29 331

(51) Int. Cl.⁷ .............................................. G06F 13/16
(52) U.S. Cl. ....................... 307/10.1; 710/305; 340/5.51
(58) Field of Search ........................ 307/9.1, 10.1–10.8; 710/305, 100; 340/5.5, 5.51; 701/29, 36

(56) References Cited

U.S. PATENT DOCUMENTS

| | | | |
|---|---|---|---|
| 5,521,588 A | | 5/1996 | Kuhner et al. |
| 5,794,164 A | | 8/1998 | Beckert et al. |
| 6,141,710 A | * | 10/2000 | Miesterfeld ................. 710/100 |
| 6,189,057 B1 | * | 2/2001 | Schwanz et al. .............. 710/72 |

FOREIGN PATENT DOCUMENTS

| | | |
|---|---|---|
| DE | 4218804 | 12/1993 |
| DE | 19625002 | 2/2000 |
| DE | 199909157 | 9/2000 |
| DE | 19720285 | 6/2001 |
| EP | 0566482 | 10/1993 |

OTHER PUBLICATIONS

Braek, et al. "Modeling Advanced Transport Telematics Architecture using Formal Definition Techniques" IEEE, 1995.

Chung, et al. "Side by Side, Step by Step, and Layer by Layer" DCOM and COBRA, Jan. 1998.

Nuemann, et al. "Ein aufkommender Standard fur verteilte System im Kfu" Kommunikation, Apr. 1998.

* cited by examiner

Primary Examiner—Gregory J. Toatley, Jr.
(74) Attorney, Agent, or Firm—Crowell & Moring LLP

(57) ABSTRACT

Networked vehicle communications system with front end unit, terminal which can be operated by a user and associated application. A vehicle communications system having a databus and at least one front end unit which is connected thereto and has a user-interface framework unit, having at least one terminal which can be operated by the user and is connected to the databus, and having at least one functionality which is implemented in the system and can be executed with the participation of the front end unit and of the terminal. The implemented functionality is divided into a part which communicates with the user-interface framework unit and has user-interface ends and into a functional component part which communicates with the user-interface end part on the one hand and with an application framework unit on the other. The user-interface end part is located in one front end unit, while the functional component part is also located there or in another front end unit or in a multi-purpose platform unit which is also connected to the databus.

3 Claims, 3 Drawing Sheets

NETWORKED VEHICLE COMMUNICATIONS SYSTEM WITH FRONT END UNIT A TERMINAL WHICH CAN BE OPERATED BY A USER AND A CORRESPONDING APPLICATION

BACKGROUND AND SUMMARY OF THE INVENTION

This application claims the priority of German Patent Document 199 293 31.7, filed Jun. 26, 1999, the disclosure of which is expressly incorporated by reference herein.

The invention relates to a vehicle communications system having a databus to which at least one front end unit with user-interface framework unit and one terminal which can be operated by the user are connected, and at least one application, also referred to below as functionality, which is implemented in the system and can be executed with the participation of the front end unit and of the terminals.

In modern motor vehicles, especially cars, numerous functionalities are implemented which are executed in the dialogue with the system user with the participation of respectively associated front end units which include associated user interfaces. These functionalities are particularly numerous telematics applications such as are specified, for example, in the German Laid-Open Application DE 196 25 002 A1.

In order to be best able to fulfill the resulting requirements, in recent times consideration has increasingly been given to using what are referred to as distributed systems, in particular systems which are based on object-oriented component models. In general electronic data processing, which have relatively high computing capacities in comparison to vehicle applications, techniques for supporting such distributed component systems are already customary, for example CORBA (Common Object Request Broker Architecture) and DCOM (Distributed Component Object Model). However, these techniques cannot be scaled down satisfactorily to small embedded units. In addition, DCOM is not presently available for the Windows CE operating system. For vehicle-end concepts for distributed systems, reference should be made, for example, to the periodical article by K. J. Neumann et al., Ein aufkommender Standard für verteilte Systeme im Kfz, atp 4/98, page 22, and the older German Patent Application 199 09 157.9 together with the literature cited there.

The present invention is addressed to providing a solution to the type of vehicle communications system of the type mentioned at the beginning, which permits, with an unacceptable amount of computing for vehicle applications, a mechanism for implementing distributed applications which are to be carried out using databus networks which are customary in vehicles, and in which the application can be kept as independent as possible of the type of bus system used.

The invention solves this problem by providing a vehicle communications system having a provision for the respective implemented functionality to be split into a part with user-interface ends and into a part with the functional components. At least the user-interface end part is part of a front end unit. The functional component part is also located in the same front end unit or else in another front end unit or in a multi-purpose platform unit which is also connected to the databus. The user-interface end part is connected to the user-interface framework unit in the respective front end unit, while the functional component part is correspondingly connected to an associated application framework unit in a communications connection. This system design constitutes a mechanism for the implementation of distributed functionalities to be executed, in particular also with respect to the subfunctions to be executed in that respect, such as display, operator control and interaction with other applications modules, with an amount of computing which is acceptable for vehicle applications.

In a further development of the invention, the respective functional component part is assigned a virtual terminal unit for communicating with the respective terminal which can be operated by the user takes place through the databus, and which contains the bus-specific implementation information required for this purpose. As a result, the functional components can be kept essentially independent of the type of databus system respectively used so that they do not necessarily need to be implemented each time another bus type is used.

In one aspect of the system, the functional component part is not located in the same unit as the user-interface end part but rather in another unit which is connected to the databus. The communication between the two parts is then carried out in the form of proxy-stub communication via the databus. With this system configuration, the user-interface ends do not need any knowledge of the distributed system environment currently present but rather they access the assigned proxy components which implement the necessary network operations. In the other unit, i.e. a further front end unit or a multi-purpose platform unit which is preferably provided centrally for a plurality of front end units, the respective stub component functions as a client of the functional components and communicates with the associated proxy component of the front end unit first mentioned. Because the entire network code is located in the proxy components and the stub components, any application-specific code can be kept completely independent of the databus network on which the system is based, without being involved in the networking, which simplifies its encoding and maintenance.

BRIEF DESCRIPTION OF THE DRAWINGS

Advantageous embodiments of the invention are illustrated in the drawings and will be described below.

DETAILED DESCRIPTION OF THE PREFERRED EMBODIMENT

Figure 1:
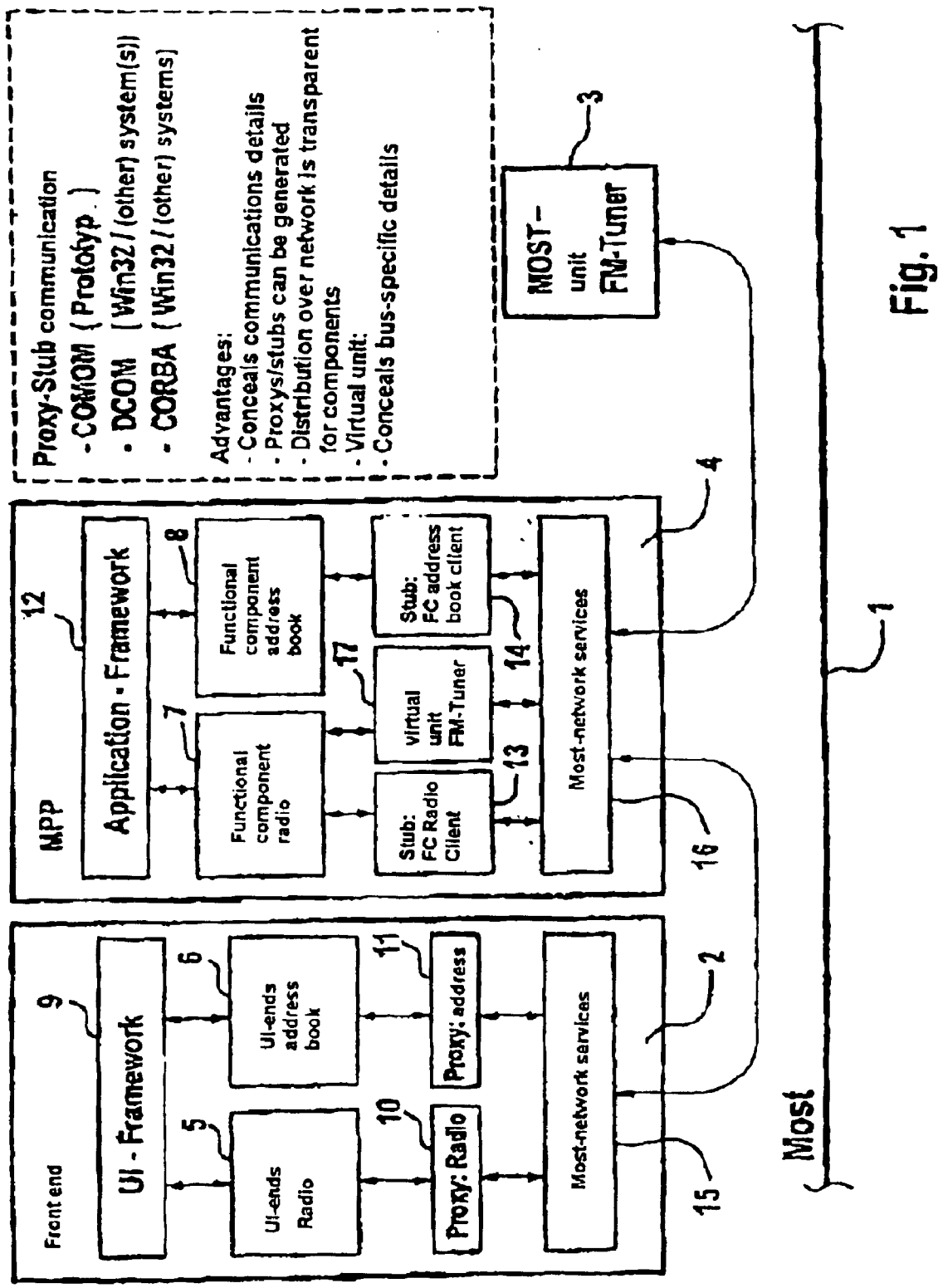
FIG. 1 shows a schematic block diagram of details of a vehicle communication system with front end unit and multi-purpose platform unit.

In the first exemplary embodiment shown in FIG. 1, the vehicle communications system contains a conventional optical databus 1 of the MOST (Media Oriented System Transport) type, to which a front end unit 2, a terminal 3 which can be operated by a user and a multi-purpose platform unit 4 are connected. Further components of the vehicle communications system, in particular further front end units and terminals and vehicle control units which can be operated by a user are not shown for the sake of clarity. In the system part shown, two applications, namely a radio functionality and an address book functionality, are implemented by way of example in order to explain the invention. The front end unit 2 is specifically a display unit and operator unit 2 for these functionalities, while the associated terminal 3, which can be operated by a user, is an FM tuner which is configured for the MOST databus 1.

The respective functionality is characteristically divided in each case into a user-interface end part which is implemented in the front end unit 2, and into a functional component part which is implemented in the multi-purpose platform unit 4, i.e. the front end unit 2 includes a component 5 with user-interface end parts (UI pages) for the radio functionality and a component 6 with user-interface end parts for the address book functionality. The multi-purpose platform (MPP) unit 4 correspondingly has a functional component part 7 for the radio functionality and a functional component part 8 for the address book functionality. The user-interface end parts 5, 6 are connected, in the front end unit 2, on the one hand to a user-interface framework unit 9 which is implemented there, and on the other hand to, in each case, one associated proxy component 10, 11. In the MPP unit 4, the functional component parts 7, 9 are connected on the one hand to an application framework unit 12 and on the other hand to associated stub components 13, 14. At the bus end, the proxy components and stub components 10, 11, 13, 14 are connected to a network service output stage (Most Net Services) 15, 16 which is suitable for the selected bus type MOST and via which the respective connection to the databus 1 is made.

In addition, a virtual terminal unit 17 is implemented in the MPP unit as a virtual FM tuner. This virtual unit contains the communication of the associated functional component part, here of the part 7, for the radio functionality with the specifically used terminal which can be operated by a user, here the FM tuner 3 which is intended for the MOST databus 1, i.e. the virtual unit 17 effects the communication of its associated functional component part 7 with the specific associated terminal 3 which can be operated by a user, via the existing databus 1, and for this purpose it contains the bus-specific implementation details of the functional components. This has the desired consequence that the functional components contained in the functional component part 7 remain independent of the bus system 1 which is respectively being used at that time, and therefore does not need to be changed automatically when said bus system 1 changes.

It is known that a distributed system configuration entails a large degree of complexity, in which case it is recommended that the systems be constructed on the highest available layer in the ISO/OSI network layer model with the layers 1 (physical connection) to 7 (presentation layer) in order to make as many network details as possible invisible and to concentrate on the applications requirements of the system. It is precisely this to which the MOST standard for multimedia applications in vehicles is directed. However, MOST is concerned mainly with communication between terminals such as CD players, tuners and CD changers and not with the communication which is desirable between the front end unit 2 and MPP unit 4 at a higher level.

The proxy-stub communication which is used permits these requirements to be fulfilled while maintaining the MOST databus 1, the present system solution which is provided as a result of this being referred to as a prototype COMOM, see the system description insert in FIG. 1. This system solution makes available a communications function at a high level, analogous to the COM/DCOM standard, and in the process uses the control channels and asynchronous channels of the MOST databus 1. Because the interface notation of the prototype COMOM is compatible with COM-IDL, COMOM can be replaced by DCOM as soon as this technology is available for Windows CE. A further alternative is the use of CORBA if another operating system is used. CORBA implementations are available for important embedded operating systems such as QNX, Chorus, VxWorks inter alia.

According to the system configuration of FIG. 1, the user-interface part of the application is composed of the user-interface ends 5, 6 which are embedded in the user-interface framework unit 9 and communicate with it. In order to resort to the functionality implemented in the respective functional component part 7, 8, the user-interface ends 5, 6 do not need any knowledge on the current distributed system environment. Instead, they access the associated proxy component 10, 11 of the functional components, which react correspondingly and in the process implement the necessary network operations. The stub components 13, 14 which are located in the MPP unit 4 act as clients of the functional components 7, 8 and communicate via the databus 1 with the proxy components 10, 11 at the front end unit 2 end. The network code which is searched for is stored in the proxy and stub components 10, 11, 13, 14 so that the entire application-specific code can be kept completely independently of the databus network 1 which is used as the basis, and does not need to be involved in the networking, which makes it easier to encode it and maintain it. The proxy and stub components 10, 11, 13, 14 can be produced automatically by IDL compilers which are available for COM/DCOM and CORBA products.

As is apparent from the description above, the vehicle communications system can be configured according to the invention in such a way that complete transparency of the distribution over the network is issued for the components. Whereas given a configuration of FIG. 1, the MPP unit 4 preferably functions as a central processing unit which serves a plurality of front end units and a plurality of applications, a further advantage of the invention consists in the fact that a system configuration is also possible without networking, i.e. a system without the functionality of the MPP unit 4 of FIG. 1. A detail of such a system is illustrated as a second embodiment of the invention in FIG. 2, functionally identical components being provided with the same reference symbols as in FIG. 1 and reference can in this respect be made to the above description relating to FIG. 1.

Figure 2:
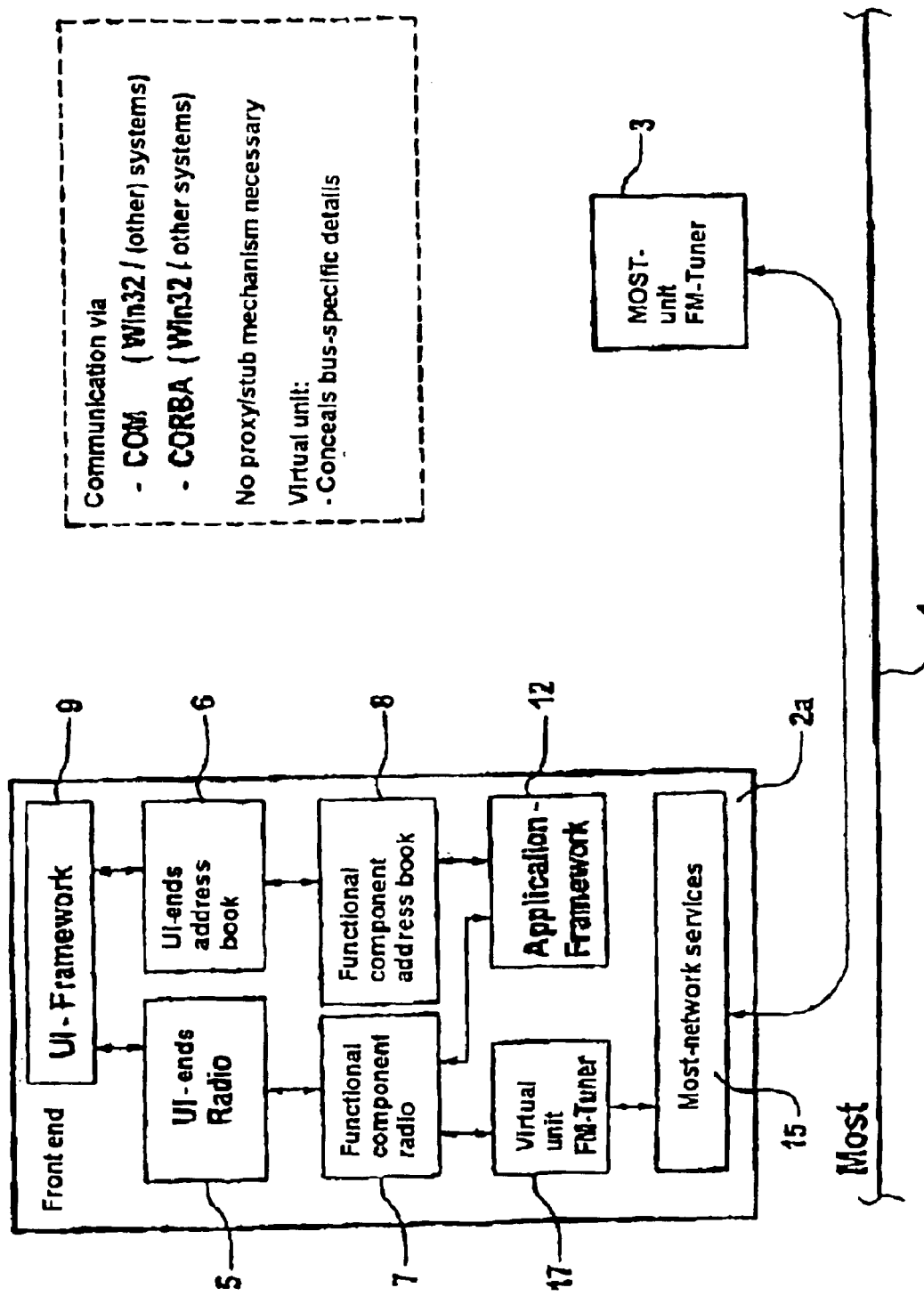
FIG. 2 shows a schematic block diagram of details of a vehicle communication system with common implementation of user-interface end part and functional component part of an application in a front end unit.

As is apparent from FIG. 2, with this implementation of the system, the components of the MPP unit of FIG. 1 are incorporated in addition to the components of the front end unit 2 of FIG. 1 in a single front end unit 2a which is modified to this extent. As a result, no network code is necessary for the communication between the user-interface end part 5, 6 and the associated functional component part 7, 8 of a respective application, so that the proxy and stub components 10, 11, 13, 14 of the system in FIG. 1 are dispensed with here. In this example, the user-interface ends 5, 6 communicate directly with the associated functional components 7, 8. This communication can be implemented in turn, for example, via COM/CORBA, see also the system description insert from FIG. 2.

Figure 3:
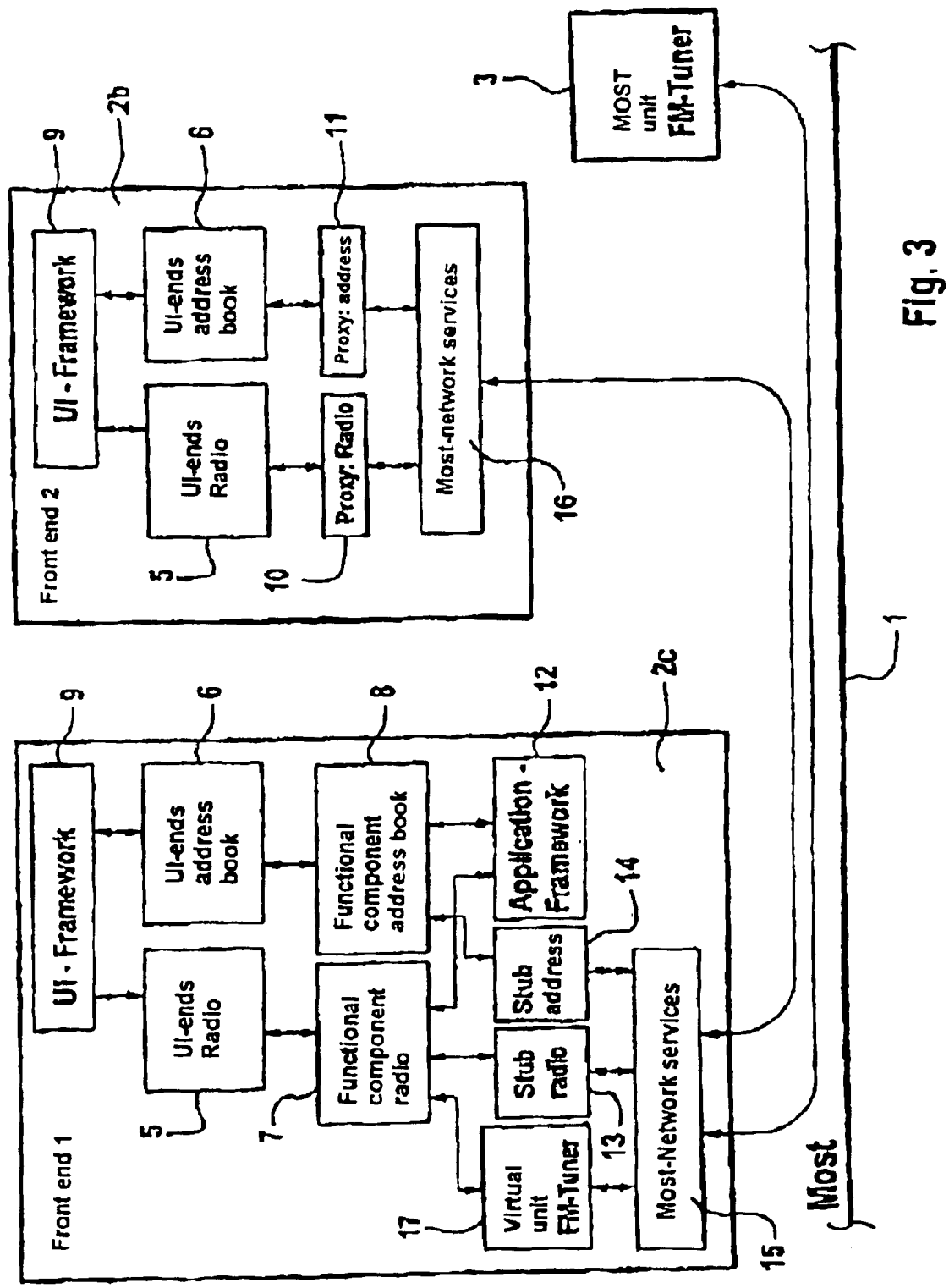
FIG. 3 shows a schematic block diagram of details of a vehicle communication system with two front end units and functionalities distributed on the latter.

A further possible system configuration is illustrated in FIG. 3, functionally identical components being again provided with the same reference symbols as in FIGS. 1 and 2 and in this respect reference can be made to the above description relating to FIGS. 1 and 2.

As is apparent from FIG. 3, the two exemplary applications (radio, address book) in this implementation are implemented in two front end units 2b, 2c, the one front end unit 2b of which is of analogous construction to the front end unit 2 in FIG. 2 without the functional component part, while the other front end unit 2c is configured as a stand-alone unit corresponding to the front end unit 2a from FIG. 2, which front end unit 2a contains both the respective user-interface end part 5, 6 and the associated functional component part 7, 8. It is then sufficient to use fewer items of efficient hardware for the front end unit 2b which is not provided with the functional component part than for the other front end unit 2c on which the functional components are run.

A number of possible applications which include associated implemented software packages are given below by way of example. An audio package which controls existing audio hardware and routes the respective data from audio sources to audio output units can thus be provided. The associated audio hardware comprises a central audio output via loudspeakers and output via headsets which are available on front end units, under the control of the sound volume and other audio parameters. Vehicle-specific properties, for example setting a currently active audio source to a lower sound volume level when a voice outputting unit become active, can be implemented in the process.

A telephone application can be used for controlling a GSM functionality, for implementing the TAPI, in particular for voice connections, for dialling telephone numbers, accepting or refusing calls and administering a call list, and for providing data connections via WAP. A radio package is provided, as described above, for controlling the tuner hardware such as a MOST-FM tuner, and is expediently configured in such a way that it provides decoded RDS messages for other services such as TMC and administers presettings and station lists for the installed front end units. A CD player/video player package controls CD player hardware which can be composed of a plurality of units, for example a CD changer and in each case a CD player in a plurality of front end units. The package administers playing lists, generates any desired playing lists and visually displays the current state of the players. If present, this package can also be responsible for playing video discs.

A vehicle package can be used to provide vehicle information which is available on vehicle databuses such as a CAN bus, in that said information is collected and made available via predefined interfaces. This vehicle information can be, for example, information on the speed, the quantity of fuel supplied and various temperature data. The information can he displayed visually and/or made available to other services.

A profile package is useful for storing profiles of components, for determining components which are affected by a profile change in order to perform a re-initialization and generate new profiles. The profiles are used to store settings of components and the user interface such as colours, audio settings etc., and are stored separately in each front end unlit. A person management package contains functionalities for personal information on an identified system user such as a personal address book, a calendar, an email function and data synchronization with other databases such as other vehicles or a fixed PC system, for example via the Internet or with Bluetooth technology.

A further package is used to allocate permission for requested user actions and in the process handle in particular conflicts if a plurality of system users request the same system functionality, but this can only be used by one user at the respective time. This package can also be used to restrict seat-related rights of use for specific users, for example for children, or to administer the profiles for releases and adaptations of rights. A user identification package is responsible for supplying a user identification to components which require such, such as an address book, email, calendar etc. The system user must then input his identity in a suitable way, for example by means of a PIN, password, fingerprint or retina sensing. A comfort package permits air-conditioning units and other comfort functions to be controlled, in so far as they are present in the vehicle.

A telematics service package is responsible for collecting generic telematics service information and distributing it to requesting components. An update package administers updates and upgrades of components and is responsible for running down the system into a state in which updating/ upgrading can be carried out, as well as for returning the system to the normal operating mode. An initialization, monitoring and diagnostics package is responsible for carrying out starting and initialization procedures, contains the capability of monitoring the operation of software and hardware components and supports system diagnostics.

A supplementary services package can be provided for making available functionalities which are based on conventional system capabilities. These additional functionalities can be, for example, an emergency call, for example automatically when a relatively serious accident is detected or semi-automatically on user request, in each case in the form of transmitted data relating to the position of the vehicle or in speech form, a log book function, such as is useful for registering costs for company vehicles and for other purposes, as well as antitheft protection with which the system can detect, given the presence of a locating module, movement of the vehicle outside specific boundaries and, here necessary, can stop the vehicle operating.

What is claimed is:

1. A vehicle communications system comprising:

a databus and at least one front end unit connected to said databus and having a user-interface framework unit, at least one terminal which is operated by the user and is connected to the databus, at least one functionality which is implemented in the system and can be executed with the participation of the at least front end unit and of the terminal, wherein the implemented functionality is divided into a first part which communicates with a user-interface framework unit and has user-interface ends and into a functional component second part which communicates with both the user-interface end part and with an application framework unit, and wherein the user-interface end part is located in one of the at least one front end unit and the functional component part is also located in said one front end unit or in another one of said at least one front end unit connected to the databus or in a multi-purpose platform unit connected to the databus.

2. The vehicle communications system according to claim 1, wherein the functional component part is assigned a virtual terminal unit via which the functional component part for communicating with the terminal, which can be operated by the user via the databus is connected, and which contains bus-specific implementation information.

3. The vehicle communications system according to claim 1, wherein the functional component part is located in said another one front end unit or the multi-purpose platform unit, and the functional component part is assigned a stub component and the user-interface end part is assigned a proxy component for the communication between the functional component part and the user-interface end part.

* * * * *